United States Patent
Kabs et al.

(10) Patent No.: US 7,173,093 B2
(45) Date of Patent: Feb. 6, 2007

(54) METHOD FOR PRODUCING AN IMPACT-RESISTANT POLYMETHYMETHACRYLATE, AND CORRESPONDING POLYMETHYLMETHACRYLATE (PMMA)

(75) Inventors: Klaus Kabs, Pfungstadt (DE); Oliver Mueck, Ginsheim-Gustavsburg (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 10/494,356

(22) PCT Filed: Jan. 15, 2003

(86) PCT No.: PCT/EP03/00336

§ 371 (c)(1),
(2), (4) Date: May 11, 2004

(87) PCT Pub. No.: WO03/064485

PCT Pub. Date: Aug. 7, 2003

(65) Prior Publication Data

US 2005/0085607 A1    Apr. 21, 2005

(30) Foreign Application Priority Data

Jan. 29, 2002 (DE) ............................... 102 03 565

(51) Int. Cl.
*C08L 33/04* (2006.01)
*C08L 33/18* (2006.01)

(52) U.S. Cl. ...................... 525/209; 525/222; 525/232; 525/238; 525/241; 525/243

(58) Field of Classification Search ................ 525/209, 525/222, 232, 238, 241, 243
See application file for complete search history.

(56) References Cited

U.S. PATENT DOCUMENTS

| | | | | |
|---|---|---|---|---|
| 5,084,495 A | * | 1/1992 | Cutter et al. ................. | 523/336 |
| 5,258,423 A | * | 11/1993 | Crabb et al. ................. | 523/206 |
| 6,890,993 B2 | * | 5/2005 | Schultes et al. ............ | 525/209 |
| 6,906,142 B2 | * | 6/2005 | Schultes et al. ............ | 525/209 |

FOREIGN PATENT DOCUMENTS

JP           03047856           2/1991

* cited by examiner

*Primary Examiner*—Robert D. Harlan
(74) *Attorney, Agent, or Firm*—Oblon, Spivak, McClelland, Maier & Neustadt, P.C.

(57) ABSTRACT

The invention relates to a novel, impact-resistant polymer based on PMMA.

20 Claims, No Drawings

METHOD FOR PRODUCING AN IMPACT-RESISTANT POLYMETHYMETHACRYLATE, AND CORRESPONDING POLYMETHYLMETHACRYLATE (PMMA)

FIELD OF THE INVENTION

The invention relates to impact-modified polymethyl methacrylate (PMMA) and to a process for preparing the polymethyl methacrylate, and also to articles which can be produced from the impact-modified PMMA.

PRIOR ART

Impact-modified PLEXIGLAS® moulding compositions are known, and are marketed by Röhm GmbH & Co. KG, for example with the grade names PLEXIGLAS®zkBR, PLEXIGLAS®zkHC, PLEXIGLAS®zkHT, PLEXIGLAS®zkHF, and PLEXIGLAS®zk.

Examples of the uses of the impact-modified moulding compositions are household articles, lamp covers, sanitary items, roofing material, and the surface-finishing of plastics via coextrusion. The brochure "Schlagzähe PLEXIGLAS®-Formmassen" [Impact-modified PLEXIGLAS® moulding compositions] from Röhm GmbH & Co. KG (No. 10/1001/06003 (d)) gives information on the other properties, such as Vicat softening point (B/50) (ISO 306), and Charpy impact and Charpy low-temperature impact strength (ISO 179).

PLEXIGLAS®GS is obtained by polymerizing methyl methacrylate and, where appropriate, other monomers and auxiliaries in the cell(-casting) process. It has a higher-molecular-weight than PLEXIGLAS®XT and is therefore not capable of further processing by extrusion or injection moulding. The forming methods used are either machining or thermoforming.

Similar qualities are also supplied by other producers. The following table compares the properties of PLEXIGLAS®GS and PLEXIGLAS®XT:

| PLEXIGLAS ® GS | PLEXIGLAS ® XT |
| --- | --- |
| Cast | Extruded |
| Absolutely colourless and clear | Absolutely colourless and clear |
| Fracture-resistant | Fracture-resistant to impact-modified (RESIST) |
| Unequalled weathering and ageing resistance | Unequalled weathering and ageing resistance |
| High-quality surface and planarity | Very good surface |
| Solid sheets, blocks pipes, rods and bars | Solid sheets, pipes, rods, multiwall sheets, corrugated sheets, mirrors |
| From 2 to 200 mm solid thickness | From 1.5 to 25 mm thickness for solid sheets, 16 and 32 mm for multiwall sheets |
| Standard formats up to 3050 × 2030 mm | Standard formats up to 4050 × 2050 mm (+extended lengths) |
| Over 30 standard colours | Over 20 standard colours |
| Good resistance to dilute acids | Good resistance to dilute acids |
| PLEXIGLAS ® GS | PLEXIGLAS ® XT |
| Cast | Extruded |
| Limited resistance to organic solvents | Limited resistance to organic solvents |
| Good resistance to alkalis | Good resistance to alkalis |
| Very easy to work, similar to hardwood | Easy to work, similar to hardwood |
| Easily thermoformable with wide processing latitude | Very easy to thermoform under ideal consistent conditions |
| Capable of very good and secure adhesion, e.g. using reactive adhesives (e.g. ACRIFIX ® 190, 192) | Capable of very good adhesion, and this includes the use of solvent-based adhesive (e.g. ACRIFIX ® 116, 117) |
| Capable of combustion approximately as hardwood; very little smoke generated | Capable of combustion approximately as hardwood; very little smoke generated |
| Usable up to about 80° C. | Usable up to about 70° C. |

There has been no lack of attempts to extend the impact-modified properties to cast materials.

DE 1 964 913 describes weathering-resistant, highly impact-resistant resins made from styrene or methyl methacrylate in the presence of a rubber-like copolymer made from α-olefins, and of a copolymer based on the monomers butene, isobutylene or liquid paraffin. The resin contains at least 50% by weight of styrene.

EP 325 875 (Norsolor) describes a resin made from an interpenetrating network based on polysiloxane and polyacrylate. The resultant plastic moulding can be further processed to give many different items. The light transmission of the resultant articles is not particularly high.

EP 447 309 (Atochem) discloses a copolymer based on polymethyl methacrylate and polyurethane. Vicat points up to 107° C. and impact strength (Charpy) of 39 kJ/m² are measured.

U.S. Pat. No. 5,084,495 solves the problem of incorporating impact-modifying particles obtained by an (aqueous) suspension polymerization process into a methyl methacrylate matrix prior to polymerization. The entire aqueous dispersion of the impact modifier is mixed with methyl methacrylate (MMA), the water is separated off, and the remainder is the organic portion of the impact modifier in the MMA. The process is inconvenient, and requires auxiliaries for breaking the dispersion of the impact modifier and a particular apparatus for phase separation.

OBJECT

An object was to find a process which produces a moulding (PMMA) and which does not require interpenetrating networks, polyurethane copolymers or inconvenient isolation steps for the impact modifier. It is also advantageous for the production of the novel mouldings to be possible on existing machinery without major modification.

Achievement of Object

It has been found that an impact-modified plastic moulding can be obtained by dissolving impact modifier or impact-modifier-containing PMMA in MMA or in MMA which has undergone incipient polymerization (syrup) and then pouring the solution into a cell and polymerizing the same by the process known per se.

This gives a cast plastic moulding with the properties of a PLEXIGLAS®GS moulding known per se with increased impact strength. The other advantageous properties, such as weathering resistance and ageing resistance, resistance to chemicals and hot water, optical brilliance and good formability, are retained.

The matrix material used may comprise a mix which comprises the usual stabilizers and which comprises other additives.

An example of a mix for the matrix material:

| | |
|---|---|
| 98–99% by weight | of methyl methacrylate |
| 0–0.3% by weight | of an unsaturated carboxylic acid |
| 0–1% by weight | of crosslinker |
| 0.5–1% by weight | of stabilizers |
| 0–0.01% by weight | of regulator |
| 0–0.01% by weight | of initiator |
| 0.01–1.0% by weight | of release agent |

Examples of compounds which may be used as crosslinker are glycol dimethacrylate and triallyl cyanurate.

Examples of compounds which may be used as stabilizers are benzotriazoles, HALS products or sterically hindered phenols, and mixtures of the abovementioned components. HALS compounds are sterically hindered amines, as described by way of example in JP 0347856. These hindered amine light stabilizers scavenge the free radicals which form during exposure to radiation.

Examples of compounds used as regulators are γ-terpines and terpinols.

The initiators used may comprise any of the commercially available free-radical initiators, such as 2,2'-azobis(isobutyronitrile).

Examples of the unsaturated carboxylic acid which may be used are methacrylic acid and acrylic acid.

The impact modifier used may comprise a core-shell or a core-shell I-shell II impact modifier.

An example of a core-shell I-shell II impact modifier has the following composition:

| | | |
|---|---|---|
| Core: | 94–97% by weight | of methyl methacrylate |
| | 2–5% by weight | of ethyl acrylate |
| | 1–0.1% by weight | of crosslinker |
| Shell I | 79–82% by weight | of butyl acrylate |
| | 13–18% by weight | of styrene or α-methylstyrene |
| | 0.1–1% by weight | of crosslinker |
| Shell II | 90–98% by weight | of methyl methacrylate |
| | 10–2% by weight | of ethyl acrylate |

Examples of the crosslinker which may be used in the impact modifier (core or shell I) are di(meth)acrylates, divinylbenzenes, and allyl (meth)acrylates. It is also possible to use a mixture of the crosslinkers components. The core:shell I:shell II ratio is 20–30:30–50:20–40% by weight. Examples of impact modifiers and their preparation are described in EP 0 828 772, or U.S. Pat. No. 3,793,402 or U.S. Pat. No. 4,690,986.

It is possible to use the impact modifier not only in pure powder form but also in the form of a masterbatch.

The underlying composition used for the masterbatch may be a commercially available PLEXIGLAS® moulding composition, such as PLEXIGLAS®7H or PLEXIGLAS®6N or PLEXIGLAS®7N. These moulding compositions are marketed by Röhm GmbH & Co. KG.

It is also possible for the underlying composition used for the masterbatch to be pellets made from PLEXIGLAS®GS grades.

The masterbatch is prepared by a conventional melt coagulation/compounding process. The amount of impact modifier in the masterbatch may be from 10 to 50% by weight, based on the total weight of the masterbatch.

EXAMPLES

Sheets with dimensions 2100×1290×4.0 mm are produced by the usual casting process between glass plates.

The casting process is described by way of example in "Kunststoff-Handbuch" [Plastics handbook], Vol. IX, p. 15, Carl Hanser Verlag, 1975 or in "Ullmanns Enzyclopädie der technischen Chemie" [Ullmann's encyclopaedia of industrial chemistry], Vol. 19, p. 22, 4th Edition, Verlag Chemie (198).

The inventive composition used was a mixture made from 80% by weight of MMA and 20% by weight of an impact modifier mixture with the following composition:

| | |
|---|---|
| 63.254 | % by weight of PLEXIGLAS ® Y7H |
| 36.746 | % by weight of an impact modifier with core-shell I-shell II structure |
| Core: | 23% by weight, based on the impact modifier, of copolymers made from MMA and crosslinker |
| Shell I: | 47% by weight, based on the impact modifier, of copolymer made from the following: butyl acrylate, styrene and a crosslinker |
| Shell II: | 30% by weight, based on the impact modifier, of copolymer made from the following: MMA, styrene, butyl acrylate, ethyl acrylate and a crosslinker. |

The comparison used comprised a commercially available PLEXIGLAS®GS 233 produced by Röhm GmbH & Co. KG. The sheet made from PLEXIGLAS® GS 233 had the same dimensions as the sheet produced according to the invention.

| | Unit | Comparison: PLEXIGLAS ® GS 233 | Formulation of the invention |
|---|---|---|---|
| Charpy | kJ/m$^2$ | 18.4 | 34.7 |
| Vicat | ° C. | 115.75 | 113.3 |
| Modulus of elasticity | | 3.227 | 2.890 |
| Light transmittance | % | 92.45 | 92.05 |

Charpy impact strength was determined ti ISO 179/1fU. The equipment is produced and marketed by the company Coesfeld. VICAT point was determined to DIN 306.

Modulus elasticity was determined to ISO 527.

The results show that production of an impact-modified cast material from MMA and copolymerized impact modifier was successful, the cast material having the usual advantageous properties of a PLEXIGLAS®GS material alongside markedly increased impact strength. These plates were colourless and clear, and did not show evidence of break-away from the glass plate or of adhesion to the glass plate.

The mouldings of the invention are suitable for any of the applications which have hitherto used PLEXIGLAS®GS or XT. Its higher impact strength also makes it particularly suitable for application in balcony cladding (colourless, coloured, transparent or opaque), as material for sunbeds, for noise barriers on traffic routes and for hoardings.

The invention claimed is:

1. A plastic molding obtained by polymerizing a mixture comprising a solution of
65–99.5% by weight of methyl methacrylate;

0–3% by weight of an unsaturated carboxylic acid;
0.5–35% by weight of a core-shell impact modifier;
0–1% by weight of crosslinker;
0.5–1% by weight of stabilizer;
0.001–0.1% by weight of initiator;
0.01–1.0% by weight of release agent; and
0.001–0.031% by weight of regulator;
by a casting process.

2. The plastic molding according to claim 1, wherein the impact modifier, in the form of a masterbatch, comprises PMMA and impact modifier.

3. The plastic molding according to claim 2, wherein the masterbatch comprises of 10–50% by weight of an impact modifier and 50–90% of a PMMA.

4. A noise barrier, which comprises: the plastic molding according to claim 1.

5. A balcony cladding, which comprises: the plastic molding according to claim 1.

6. A method for reducing noise, which comprises:
interposing an article comprising the plastic molding of claim 1 proximal to a noise source.

7. A plastic molding obtained by casting a solution into a mold and
polymerizing the solution,
wherein the solution comprises
65–99.5% by weight of methyl methacrylate;
0–3% by weight of an unsaturated carboxylic acid;
0.5–35% by weight of a core-shell impact modifier;
0–1% by weight of crosslinker;
0.5–1% by weight of stabilizer;
0.001–0.1% by weight of initiator;
0.01–1.0% by weight of release agent; and
0.001–0.031% by weight of regulator.

8. The molding of claim 7, having a light transmittance of at least 92.05%.

9. The plastic molding according to claim 7, wherein the core of the core-shell impact modifier is a polymer comprising polymerized units of 94–97% by weight of methylmethacrylate, 2–5% by weight of ethylacrylate, and 1–0.1% by weight of a crosslinker, and the shell of the core-shell impact modifier is at least one of (i) a polymer comprising polymerized units of butylacrylate in an amount of 79–82% by weight, styrene or α-methylstyrene in an amount of 13–18% by weight, and a crosslinker in an amount of 0.1–1% by weight, and a (ii) polymer comprising polymerized units of methylmethacrylate in an amount from 90–98% by weight and ethylacrylate in an amount of 10–2% by weight.

10. The plastic molding according to claim 7, wherein the impact modifier is a core-shell I-shell II impact modifier.

11. The plastic molding of claim 10, wherein the core-shell I-shell II impact modifier comprises a core comprising a polymer comprising 94–97% by weight of polymerized methylmethacrylate units, 2–5% by weight of polymerized ethylacrylate monomer units, and 1–0.1% by weight of a crosslinker; the shell I comprises a polymer comprising 79–82% by weight of polymerized butylacrylate monomer units, 13–18% by weight of at least one of styrene and α-methylstyrene polymerized monomer units, and 0.1–1% by weight of a crosslinker; and the shell II comprises a polymer comprising 90–98% by weight of polymerized methylmethacrylate monomer units and 10–2% by weight of polymerized ethylacrylate monomer units.

12. A noise barrier, comprising:
the plastic molding according to claim 7.

13. A balcony cladding, comprising:
the plastic molding according to claim 7.

14. A method for reducing noise, comprising:
interposing an article comprising the plastic molding of claim 7 proximal to a noise source.

15. The plastic molding according to claim 1, which does not contain any one of an interpenetrating network, a polyurethane copolymer.

16. The plastic molding according to claim 7, which does not contain any one of an interpenetrating network and a polyurethane copolymer.

17. The plastic molding of claim 1, which is clear.

18. The plastic molding of claim 7, which is clear.

19. The molding according to claim 1, which is colorless and clear.

20. The molding according to claim 7, which is colorless and clear.

* * * * *